(12) United States Patent
Storhas et al.

(10) Patent No.: US 12,240,640 B2
(45) Date of Patent: Mar. 4, 2025

(54) METHOD FOR INSERTING PRODUCTS INTO TRAYS AND LOADING STATION

(71) Applicant: MULTIVAC SEPP HAGGENMUELLER SE & CO. KG, Wolfertschwenden (DE)

(72) Inventors: Matthias Storhas, Babenhausen (DE); Norbert Woerz, Erkheim (DE)

(73) Assignee: MULTIVAC Sepp Haggenmueller SE & Co. KG, Wolfertschwenden (DE)

( * ) Notice: Subject to any disclaimer, the term of this patent is extended or adjusted under 35 U.S.C. 154(b) by 0 days.

(21) Appl. No.: 17/708,356

(22) Filed: Mar. 30, 2022

(65) Prior Publication Data
US 2022/0315256 A1 Oct. 6, 2022

(30) Foreign Application Priority Data
Mar. 30, 2021 (DE) .......................... 102021107944.6

(51) Int. Cl.
*B25J 15/00* (2006.01)
*B65B 5/10* (2006.01)
(Continued)

(52) U.S. Cl.
CPC .............. *B65B 5/105* (2013.01); *B65B 35/24* (2013.01); *B65G 47/82* (2013.01); *B65G 47/88* (2013.01); *B65G 47/914* (2013.01)

(58) Field of Classification Search
CPC ......... B65B 5/105; B65B 35/16; B65B 35/18; B65B 35/36; B65B 35/38; B65B 43/185; B65B 43/48; B65B 61/28; B65G 47/42; B25J 9/0093; B25J 15/0052; B25J 15/0066
(Continued)

(56) References Cited

U.S. PATENT DOCUMENTS 4,804,081 A * 2/1989 Lenhardt ............ B65G 21/2036
198/689.1
4,907,398 A * 3/1990 Holze ..................... B65B 5/068
53/448
(Continued)

FOREIGN PATENT DOCUMENTS

DE 199 32 905 A1 1/2001
DE 10 2004 009 584 A1 9/2005
(Continued)

OTHER PUBLICATIONS

German Search Report Dated Dec. 23, 2021, Application No. 10 2021 107 944.6, Applicant Multivac Sepp Haggenmueller SE & Co. KG, 5 Pages.
(Continued)

*Primary Examiner* — Thanh K Truong
*Assistant Examiner* — Patrick B Fry
(74) *Attorney, Agent, or Firm* — Brooks Kushman P.C.

(57) ABSTRACT

The disclosure relates to a method for inserting products into trays at a loading station for a tray sealer, where a tray of several trays loaded with product by way of a gripper unit to a target value at the loading station and provided therein on a tray conveyor is pushed directly onto a discharge belt of the loading station by way of a tray pusher formed on the gripper unit. The disclosure furthermore relates to a loading station for a tray sealer.

16 Claims, 14 Drawing Sheets

(51) Int. Cl.
  *B65B 35/16* (2006.01)
  *B65B 35/24* (2006.01)
  *B65B 35/36* (2006.01)
  *B65B 43/48* (2006.01)
  *B65B 61/28* (2006.01)
  *B65G 47/42* (2006.01)
  *B65G 47/82* (2006.01)
  *B65G 47/88* (2006.01)
  *B65G 47/91* (2006.01)

(58) Field of Classification Search
  USPC .................................................. 53/251, 252
  See application file for complete search history.

(56) References Cited

U.S. PATENT DOCUMENTS

| | | | |
|---|---|---|---|
| 6,901,726 B2 | 6/2005 | Hueppi et al. | |
| 7,596,926 B2* | 10/2009 | Schulte | B65B 19/00 |
| | | | 414/793 |
| 7,752,828 B2* | 7/2010 | Gudim | B65B 59/001 |
| | | | 198/803.11 |
| 10,124,920 B2* | 11/2018 | Kern | B65B 57/20 |
| 10,745,161 B2* | 8/2020 | Notsch | B65B 5/06 |
| 11,174,057 B2* | 11/2021 | Dunkel | B65B 35/38 |
| 2006/0012197 A1 | 1/2006 | Anderson et al. | |
| 2010/0269453 A1* | 10/2010 | Takai | A23L 11/45 |
| | | | 53/391 |
| 2011/0243707 A1* | 10/2011 | Dumas | B65B 5/105 |
| | | | 700/259 |
| 2013/0283731 A1* | 10/2013 | Komp | B65B 35/38 |
| | | | 53/268 |
| 2018/0345520 A1* | 12/2018 | Eckhardt | B26D 7/32 |
| 2019/0270197 A1 | 9/2019 | Wagner et al. | |
| 2019/0329403 A1* | 10/2019 | Ueda | B25J 15/0052 |
| 2021/0276756 A1* | 9/2021 | Dunkel | B25J 9/0093 |
| 2022/0219917 A1* | 7/2022 | Yang | B25J 5/02 |

FOREIGN PATENT DOCUMENTS

| | | |
|---|---|---|
| DE | 10 2007 005 000 A1 | 9/2007 |
| DE | 10 2019 101 852 A1 | 7/2020 |
| DE | 102021107944.6 | 12/2021 |
| EP | 1 352 831 A1 | 10/2003 |
| EP | 2 500 276 A1 | 9/2012 |
| WO | 2021/044053 A1 | 3/2021 |

OTHER PUBLICATIONS

European Search Report (with English Machine Translation) Dated May 11, 2023, Application No./Patent No. 22164994.0-1014 / 4067241, Applicant Multivac Sepp Haggenmuller SE & Co. KG, 10 Pages.

* cited by examiner

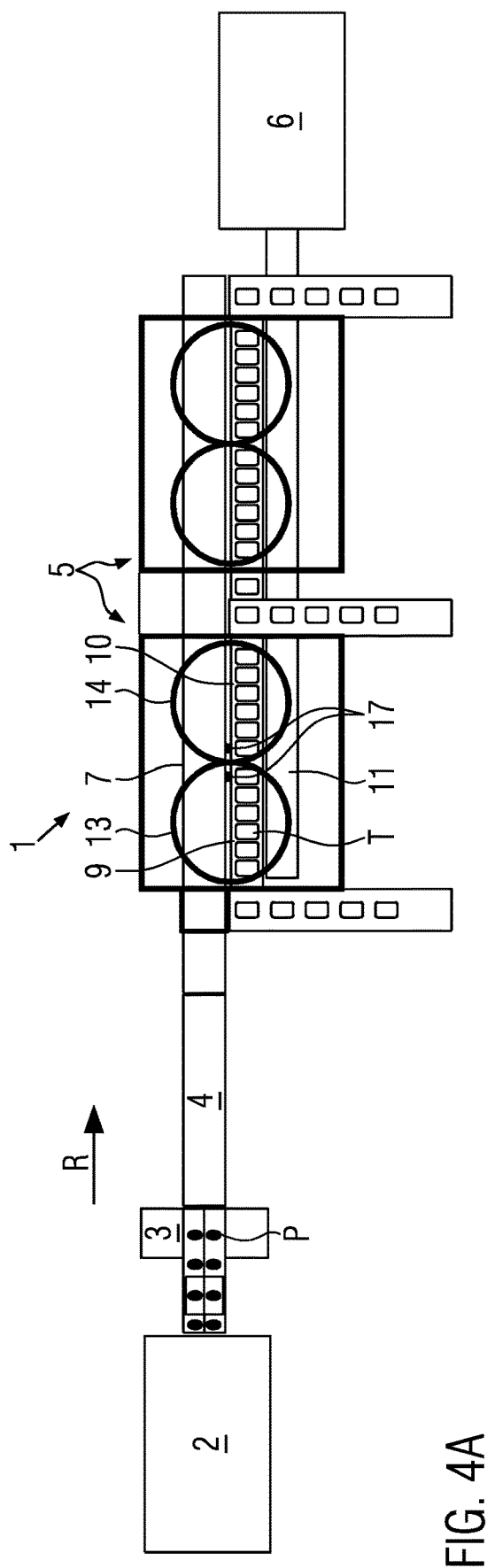
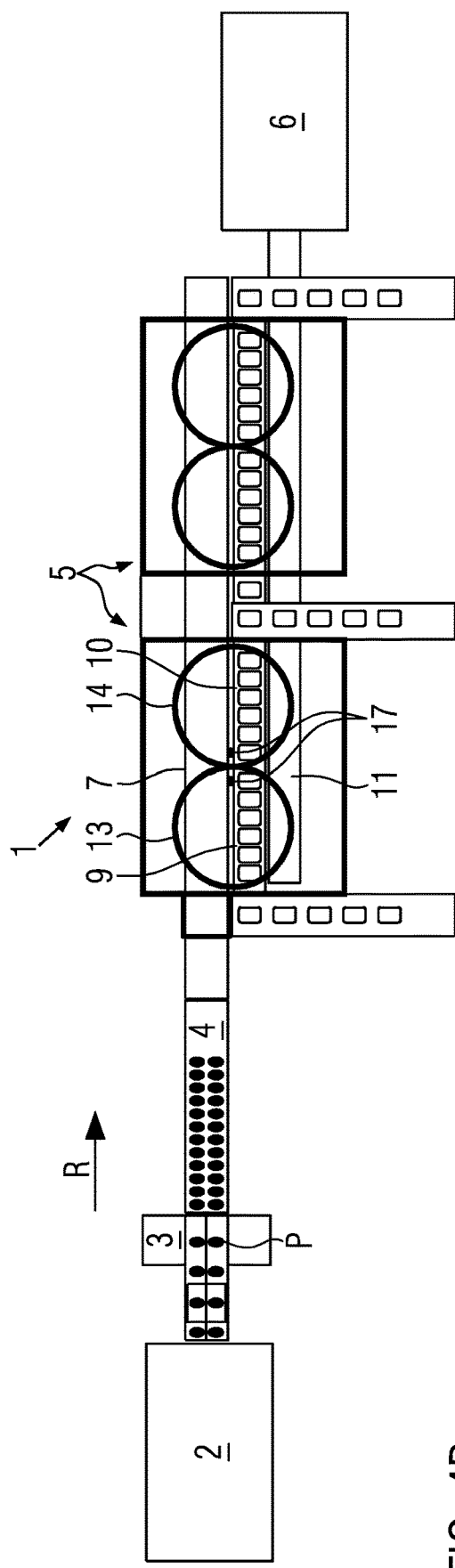
FIG. 4A
FIG. 4B

METHOD FOR INSERTING PRODUCTS INTO TRAYS AND LOADING STATION

CROSS-REFERENCE TO RELATED APPLICATIONS

This application claims foreign priority benefits under 35 U.S.C. § 119(a)-(d) to German patent application number DE 10 2021 107 944.6, filed Mar. 30, 2021, which is incorporated by reference in its entirety.

TECHNICAL FIELD

The present disclosure relates to a method for inserting products into trays at a loading station for a tray sealer. The disclosure furthermore relates to a loading station for a tray sealer.

BACKGROUND

EP 1 352 831 A1 discloses a method and a device for filling bulk goods into containers by way of a picker device, where a relative speed between the supply of the containers and the supply of the bulk goods in the region of the picker device is controlled. The relative speed can there take place in dependence of a filling level of at least one storage element associated with the picker device.

At a further loading station employed in practice, trays are positioned consecutively on a tray conveyor for being loaded with products. Once the tray fed in at the front is loaded with products to the target value, e.g., at a predetermined weight, it is pushed by a mechanical pusher onto a discharge belt arranged adjacent to the tray conveyor and from there transported to a tray sealer positioned downstream.

Due to the conventional, in particular weight-based, loading logic, it can happen that one of the other trays on the tray conveyor, i.e., not the tray that is fed in at the foremost position, is first fully loaded with product and then needs to be cycled through to the pusher for it to be pushed from the tray conveyor onto the discharge belt. As a result, this tray that was first fully loaded arrives later than possible at the tray sealer positioned downstream, which reduces the latter's production rate. In other words, the fully loaded tray remains positioned on the tray conveyor for an unnecessarily long time until it has moved to the foremost position up to the pusher. This delays the loading process and leads to a reduced throughput rate at the loading station and, in particular, also at other machines that are in functional operation therewith.

SUMMARY

An object of the disclosure is to improve a method and a loading station for a tray sealer such that a higher throughput rate arises.

The disclosure relates to a method for inserting products into trays at a loading station for a tray sealer. According to the disclosure, a tray of several trays loaded with product to a target value by way of a gripper unit at the loading station and provided therein on a tray conveyor is pushed directly onto a discharge belt of the loading station by way of a tray pusher formed on the gripper unit. This makes it possible to push a tray fully loaded with product onto the discharge belt regardless of its position on the tray conveyor, which means that its place on the tray conveyor is immediately free for another tray that is not yet loaded to a target value. This loading logic can prevent fully loaded trays from occupying a space on the tray conveyor for too long a period of time, which could reduce the throughput rate of the loading station.

In the method according to the disclosure, the gripper unit is used for loading the trays as well as for pushing trays that are completely loaded with product, as a result of which it fulfills a dual function at the loading station. The gripper unit itself is present in a compact configuration at the loading station for loading the trays with products and pushing the trays loaded with products in a temporally optimized manner.

A tray can be pushed using the gripper unit onto the discharge belt without delay when it is loaded to a target value. The term "to a target value" can be present in terms of a desired total weight, including a tolerated weight deviation, of the products inserted into the trays and/or in terms of a desired number of products inserted thereinto.

Preferably, the gripper unit pushes the tray loaded with the product to a target value onto the discharge belt already when another tray conveyed ahead on the tray conveyor has not yet been loaded with product to a target value. This departs from the conventional "first in-first out" loading logic. Instead, the gripper unit of the disclosure makes it possible for a tray that it has loaded to the target value to be pushed immediately onto the discharge belt. The loading status of the other trays positioned on the tray conveyor is then irrelevant. In departure from conventional practice, the loading principle "first full-first out" is therefore pursued in this embodiment, as a result of which the throughput rate can be increased.

One variant provides that the gripper unit pushes the tray loaded with product to a target value onto the discharge belt by way of a guide system arranged on the side of the tray conveyor and adjustable between a first and a second position. In particular, it is possible for the guide system at the tray conveyor when positioned in its first position to be used as a tray guide along the tray conveyor. In the second position, the guide system, together with the tray conveyor and the discharge belt, can form a transport plane for pushing trays loaded with product. The guide system can therefore be used in its second position as a bridge between the tray conveyor and the discharge belt across which trays loaded with product are pushed.

The guide system can comprise, for example, a rail which extends substantially over the length of the tray conveyor and is adjustable in height between the first and the second position. The rail is preferably configured as a perforated section so that the fully loaded trays can be pushed thereacross more easily.

According to one embodiment of the disclosure, the tray pusher on the gripper unit is adjusted from a retracted position to an extended position for pushing the tray loaded with product to a target value onto the discharge belt. The tray pusher can be adjusted between the retracted and the extended position, for example, by way of a pneumatic drive provided on the gripper unit, e.g., by way of a pneumatic cylinder installed thereon. It is conceivable that the adjustment of the tray pusher between the retracted and the extended position is coupled to a motion of a holding down device provided on the gripper unit.

Preferably, the trays positioned on the tray conveyor are suctioned at their tray bases at least temporarily during the loading process and/or while they are being fed onto the tray conveyor. This ensures that the trays placed and/or conveyed on the tray conveyor maintain a desired orientation so that the gripper unit using the tray pusher provided thereat can optimally push the trays loaded with product from the tray conveyor onto the discharge belt. It would be conceivable for the suction effect at the base of the tray to be interrupted while a tray loaded with product is being pushed. This enables the tray to be pushed with less force and can prevent the tray loaded with product to a target value from tipping down when pushed onto the discharge belt.

The disclosure further relates to a loading station for a tray sealer, comprising at least one picker device with a gripper unit comprising a product gripper that is configured to pick up a product made available to the loading station and insert it into a tray fed to the loading station.

According to the disclosure, the gripper unit further comprises a tray pusher for pushing a tray loaded by way of the product gripper. Due to the gripper unit comprising a product gripper for loading the trays as well as a tray pusher for pushing the trays, it forms a multifunctional unit at the loading station according to the disclosure and with a compact structure enables an increased the throughput of trays loaded with product to a target value. This has a positive effect on the throughput of the tray sealer positioned downstream.

The gripper unit employed at the loading station according to the disclosure also enables an increased throughput for the loading station largely for the reason that the gripper unit is positioned above the tray when the latter is loaded with product to a target value anyway, and can therefore push the fully loaded tray under itself to the discharge belt immediately, i.e., without having to be moved back to a starting position. In other words, the gripper unit employed at the loading station according to the disclosure makes it possible for the loading of the tray and the pushing of the tray in the state loaded to a target value to transition seamlessly, whereby process times at the loading station can be optimized. Overall, this has a positive effect on further process times at the machines positioned in the periphery of the loading station and interacting therewith.

An advantageous variant provides that the tray pusher comprises at least one pusher edge for pushing loaded trays. The tray pusher can use the pusher edge to make direct contact with a tray edge of the tray in order to push the tray from the tray conveyor onto the discharge belt. The pusher edge can be configured having the form of an angled sheet metal part or an angled plastic part. A variant provides that the pusher edge forms a profile that contacts the tray edge at oppositely disposed ends of one side thereof in order to push the tray onto the discharge belt in a desired orientation.

The gripper unit preferably comprises at least one pneumatic drive for adjusting the tray pusher, for example, between a retracted and an extended position. It is possible for the pneumatic drive to be configured in the form of a pneumatic cylinder which is arranged on the gripper unit and can be supplied by way of compressed air supplied to the latter. It is conceivable that the pneumatic drive on the gripper unit is configured exclusively for operating the tray pusher. As an alternative to this, it could be that the pneumatic drive on the gripper unit adjusts a further functional component, for example, a holding down device, where the tray pusher is coupled to a motion of the holding down device.

It is conceivable that the gripper unit comprises at least one linear guide for the tray pusher. This ensures that the tray pusher can is mounted to be adjustable precisely on the gripper unit. For example, the tray pusher on the gripper unit can be adjusted therewith between a retracted position and an extended position. Furthermore, the linear guide provides mechanical reinforcement for pushing trays that are fully loaded with product, in particular when the tray pusher is in the extended position. This means that the tray pusher remains perfectly operational over the long term.

The product gripper is preferably configured as a suction gripper or as a holding down gripper. As a suction gripper, the product gripper is connected to a vacuum pump provided at the loading station. As a suction gripper, the product gripper can suck onto the upper side of the products provided for loading them into the trays provided. As a holding down gripper, the product gripper comprises lateral pick-up scoops and a holding down device arranged between them. The product gripper can use the pick-up scoops to move under a product provided and pick it up. The holding down device can be lowered onto the product from above to fix it in place on the pick-up scoops.

According to one embodiment variant, the tray pusher is coupled to a motion of the holding down device. To push a tray fully loaded with product, the holding down device and therefore also the tray pusher attached to it can be adjusted from a lowered position, in which the holding down device fixes in place the product picked up on the pick-up scoops, to a position lowered further, whereby the tray pusher, in particular its pusher edge, is positioned below the pick-up scoops in order to contact the tray at the tray edge and push it.

A preferred variant provides that the loading station comprises at least one conveyor belt for feeding individual products, at least one tray conveyor for feeding empty trays, and at least one discharge belt for removing trays loaded with product. The conveyor belt, the tray conveyor, and the discharge belt can be positioned adjacent to one another in this order, in particular form parallel transport sections.

Preferably, the loading station comprises between the tray conveyor and the discharge belt at least in sections a guide system which can be adjusted between a first position in which the guide system can be employed for the tray conveyor as a tray guide, and a second position in which the guide system forms a bridge between the tray conveyor and the discharge belt across which trays loaded with product can be pushed.

It is conceivable that the guide system comprises a rail that is adjustable in height which, in the first position, forms a guide edge for the trays conveyed on the tray conveyor, and in the second position closes a gap between the tray conveyor and the discharge belt so that the tray conveyor, the rail, and the discharge belt form a common transport plane.

Instead of a rail, the guide system could comprise several rotatable guide segments that are arranged laterally along the tray conveyor. In their first position on the tray conveyor, the pivotable guide segments form a side panel as a tray guide and can be rotated about a horizontal pivot axis to the second position in which the guide segments form a bridge for closing the gap between the tray conveyor and the discharge belt. The trays can be pushed across this bridge onto the discharge belt. The respective guide segments can be controlled individually, in groups or all together, for example, by way of a servo motor mounted to the tray conveyor.

The tray conveyor preferably comprises at least two transport belts running in parallel as well as at least one suction unit arranged between them which is configured to suction the trays transported along the tray conveyor at their tray bases. Suctioning the respective trays prevents them from slipping along the tray conveyor during transport, as a result of which they might assume an undesirable inclined position on the tray conveyor. Suctioning the respective trays therefore promotes the trays maintaining a desired orientation along the tray conveyor.

It is possible for the tray conveyor to comprise several stopper elements that can be adjusted in the direction of transport of the tray conveyor in terms of the size of the trays to be loaded. The stopper elements can ensure that the trays arriving on the tray conveyor are positioned at predetermined distances from one another for the loading process. Furthermore, the respective stopper elements can be used at least in some regions as support for the respective tray bases so that the respective trays are positioned in a stable manner on the tray conveyor, in particular in the loaded state.

The disclosure further relates to a packaging system that comprises a slicing machine for producing individual products, also known in technical circles as a portioner, a weighing system for weighing the individual products, at least one loading station according to the disclosure, as well as a tray sealer for sealing trays loaded with product. This packaging system then forms a packaging line, the throughput of which is decisively enhanced by the loading station according to the disclosure and the method according to the disclosure carried out there At least one feed device with a buffer function for the products provided can be provided at the packaging system between the slicing machine and the loading station according to the disclosure. This feed device can be configured to accumulate the products cut by the slicing machine, group them to a predetermined format, and pass them on to the loading station with desired spacings to better coordinate the product flow at the loading station.

At least one image recording system can be arranged at the feed device and/or at the loading station and be configured to record the products fed for the respective loading process using the picker device. The image recordings captured by the image recording system can be combined with the respective weight data recorded upstream by the weighing system and used to control the loading process by the picker device.

BRIEF DESCRIPTION OF THE DRAWINGS

Advantageous embodiments of the disclosure shall be explained in more detail using the figures, where in detail:

FIGS. 4A-J show a schematic illustration of the method according to the disclosure;

Same components are provided with the same reference characters throughout the figures.

DETAILED DESCRIPTION

Figure 1:
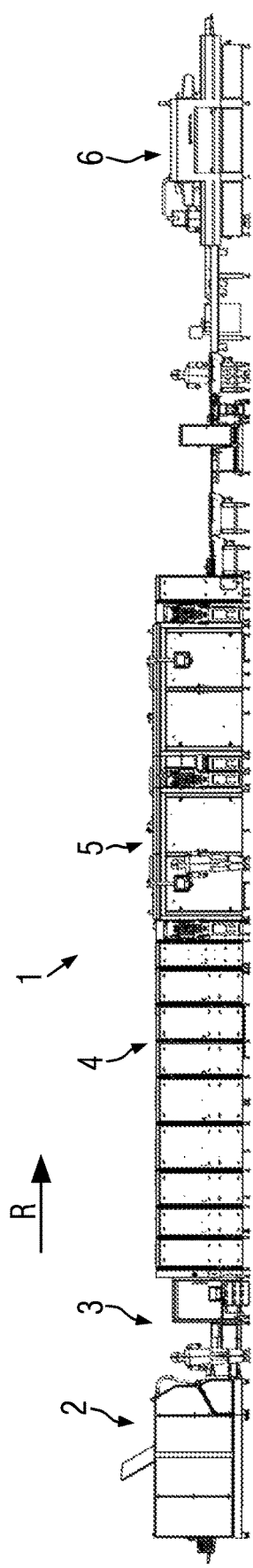
FIG. 1 shows a packaging system with two loading stations arranged adjacent to one another.

FIG. 1 shows a packaging system 1. Packaging system 1 comprises a slicing machine 2 for producing individual products P, a weighing system 3 for weighing individual products P, a feed device 4, two loading stations 5, and a tray sealer 6 for sealing trays T loaded with product which are arranged in this order in direction of production R. Slicing machine 2, also known in technical circles as a portioner, is configured to slice products P at the inlet to packaging system 1, for example, spare ribs, which are each weighed by weighing system 3, arranged in a specific format along feed device 4, loaded into trays T within loading stations 5, and transported onward to tray sealer 6 for being packed into trays T there.

Figure 2:
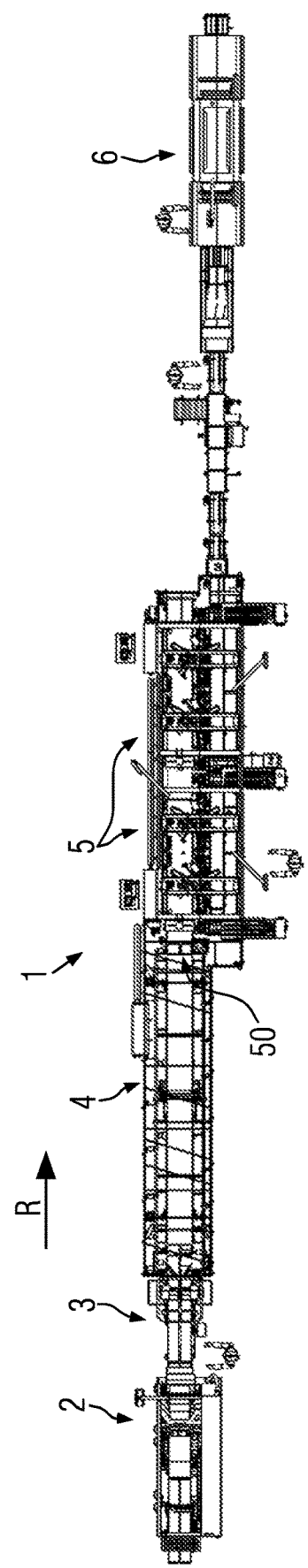
FIG. 2 shows the packaging system from FIG. 1 in a top view.

FIG. 2 shows packaging system 1 from FIG. 1 in a top view. Loading stations 5 arranged adjacent to one another, of which only one is described in more detail hereafter, serve to load trays T provided therein with products P that are fed into loading stations 5. Loading stations 5 are also formed to transport trays T loaded with product away in the direction of tray sealer 6. An image recording system 50, also referred to as a vision system, is positioned at the inlet to loading station 5 that is arranged first in direction of production R.

Figure 3:
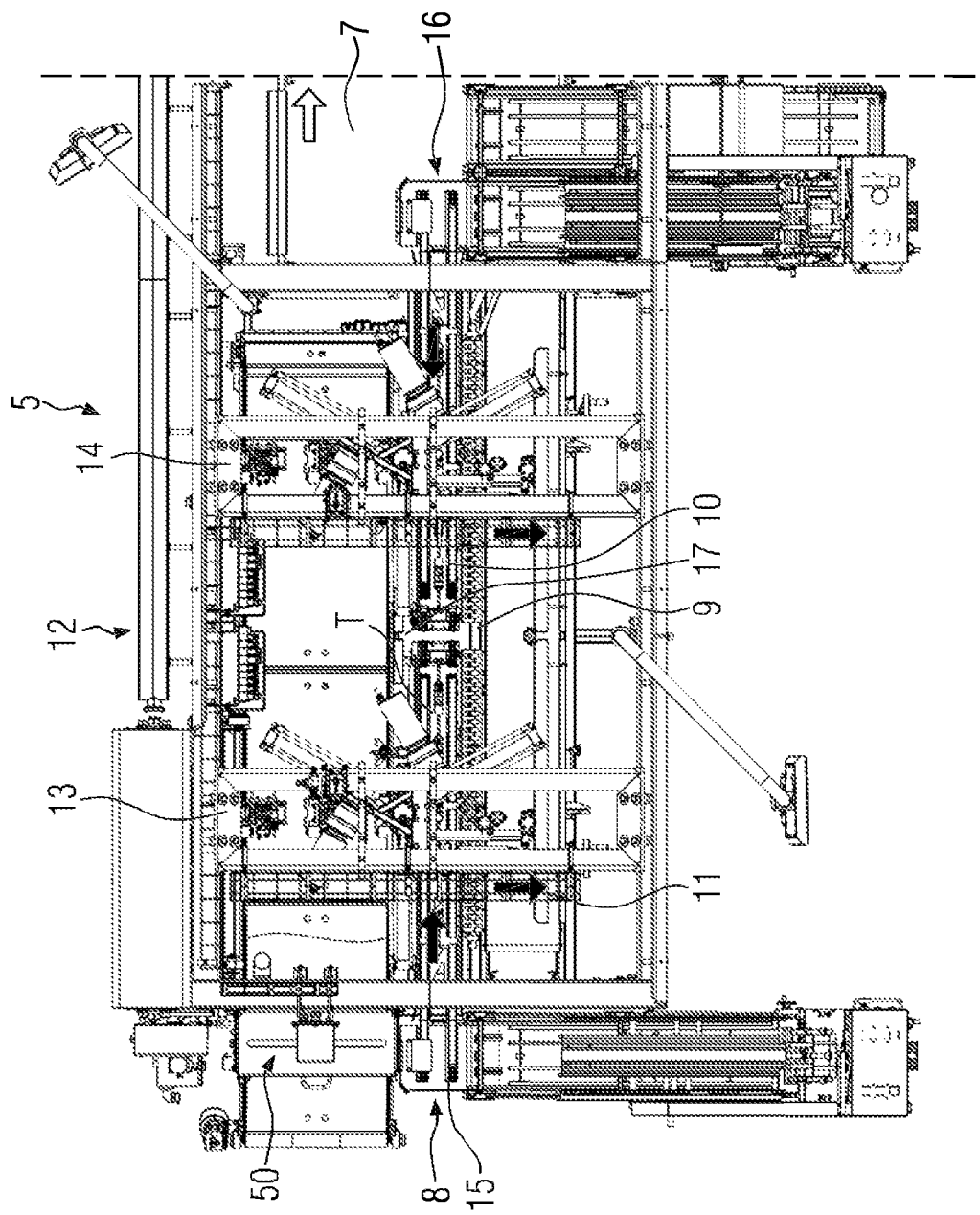
FIG. 3 shows a loading station in an isolated illustration.

FIG. 3 shows one of loading stations 5 in an isolated illustration in a top view. Loading station 5 comprises a conveyor belt 7 for feeding individual products P. A tray conveyor 8 is positioned adjacent to conveyor belt 7. Tray conveyor 8 is configured to provide empty trays T to be loaded with products P within loading station 5. According to FIG. 3, tray conveyor 8 includes a first tray conveying section 9 and a second tray conveying section 10 which are positioned one behind the other. First and second tray conveying sections 9, 10 transport trays T positioned thereon towards one another, i.e., in opposite directions, which is illustrated by the arrows on tray conveyor 8 pointing towards one another.

FIG. 3 further shows that loading station 5 comprises a discharge belt 11 which is used to transport fully loaded trays T away. Loading station 5 further includes a picker device 12 with a first picker 13 and a second picker 14. First picker 13 is configured to pick up products P provided on conveyor belt 7 and insert them into trays T that are positioned on the first tray conveying section. Second picker 14 positioned downstream in direction of production R is configured to pick up products P that have not been loaded by first picker 13 and to insert them into trays T that are positioned on second tray conveying section 10.

FIG. 3 further shows that a first destacker 15 is positioned at the inlet to first tray conveying section 9 and a second destacker 16 is positioned at the inlet to second tray conveying section 10. Trays T delivered according to FIG. 3 by destacker 15 to first tray conveying section 10 are made available on first tray conveying section 10 at five adjacent positions for receiving products P. Trays T delivered by destacker 16 to second tray conveying section 10 are likewise made available at five adjacent positions for loading products P. In the direction of transport of two tray conveying sections 9, 10 at the respective foremost position, a mechanical pusher 17 is associated with respective tray T positioned there for pushing tray T, which has been fully loaded at this position in the course of the loading process, onto discharge belt 11.

FIGS. 4A to 4J show a schematic illustration of a method for inserting products P into trays T in loading station 5.

At the beginning, individual products P are produced by way of slicing machine 2 according to FIG. 4A and are subsequently fed in direction of production R to weighing system 3. Weighing system 3 weighs individual products P, where product-related data is stored in terms of the respective product weights and is retrievable at loading station 5 for the later loading process.

Figure 4C:
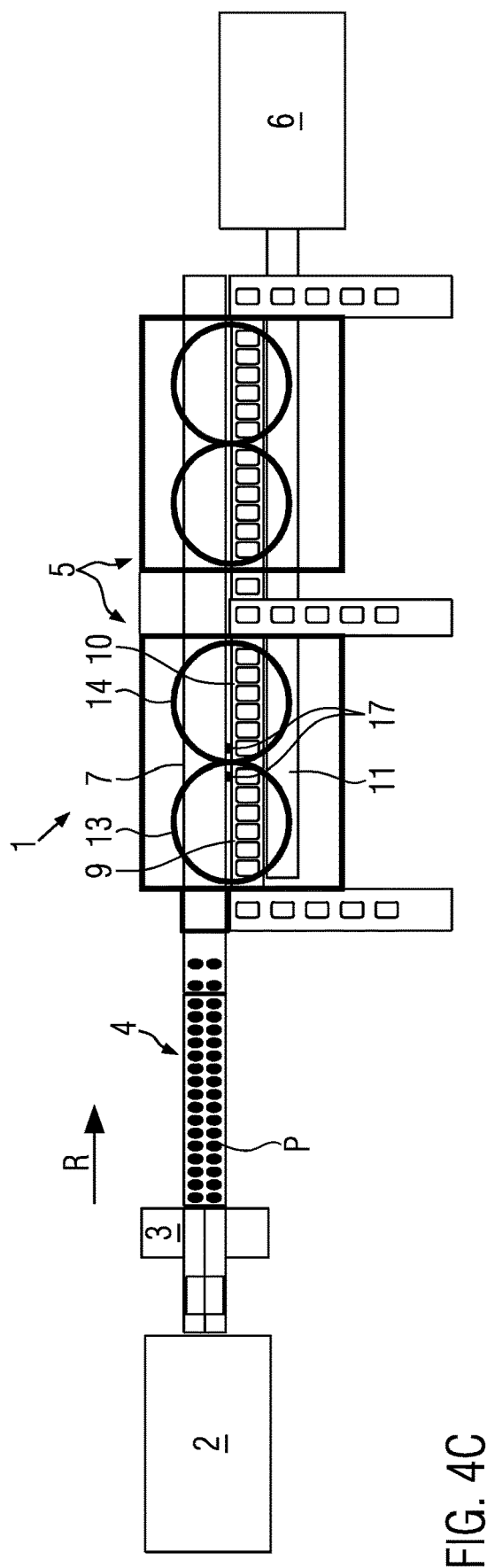

FIG. 4B shows that products P transferred from weighing system 3 to feed device 4 are grouped in a predetermined format. Based on the format produced, respective products P can be transferred according to FIG. 4C to conveyor belt 7 of loading station 5 at predetermined distances from one another.

Figure 4D:
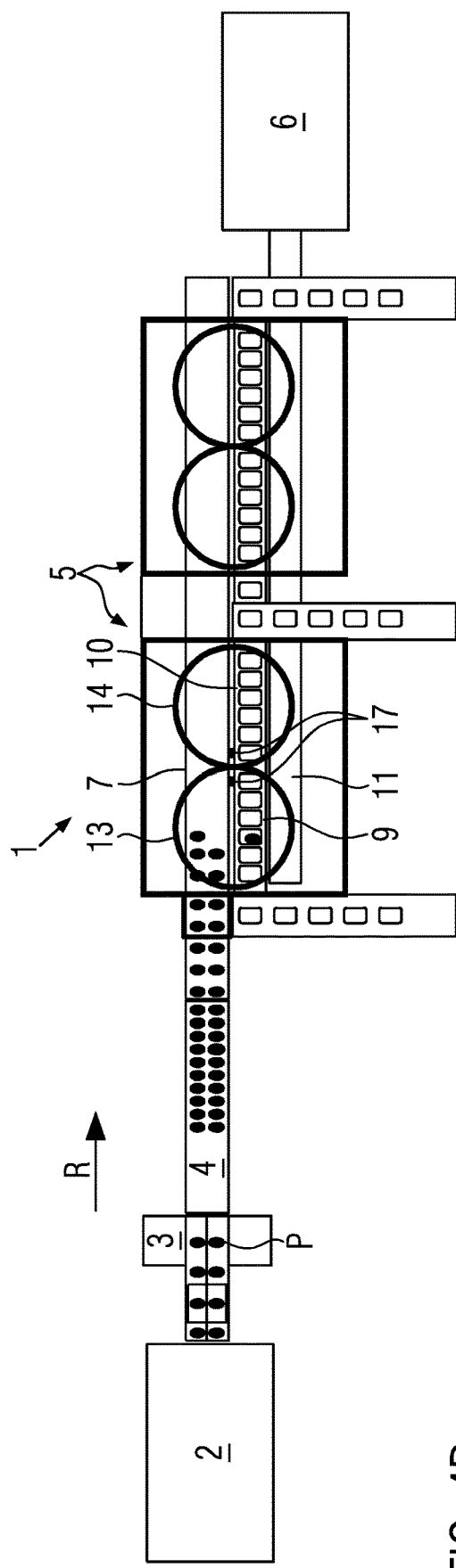

FIGS. 4C and 4D show that slicing machine 2 is being reloaded with a new product batch. FIG. 4D also shows that first picker 13 of loading station 5 begins to load products P transported into loading station 5 on conveyor belt 7 into trays T provided at first tray conveying section 9.

Figure 4E:
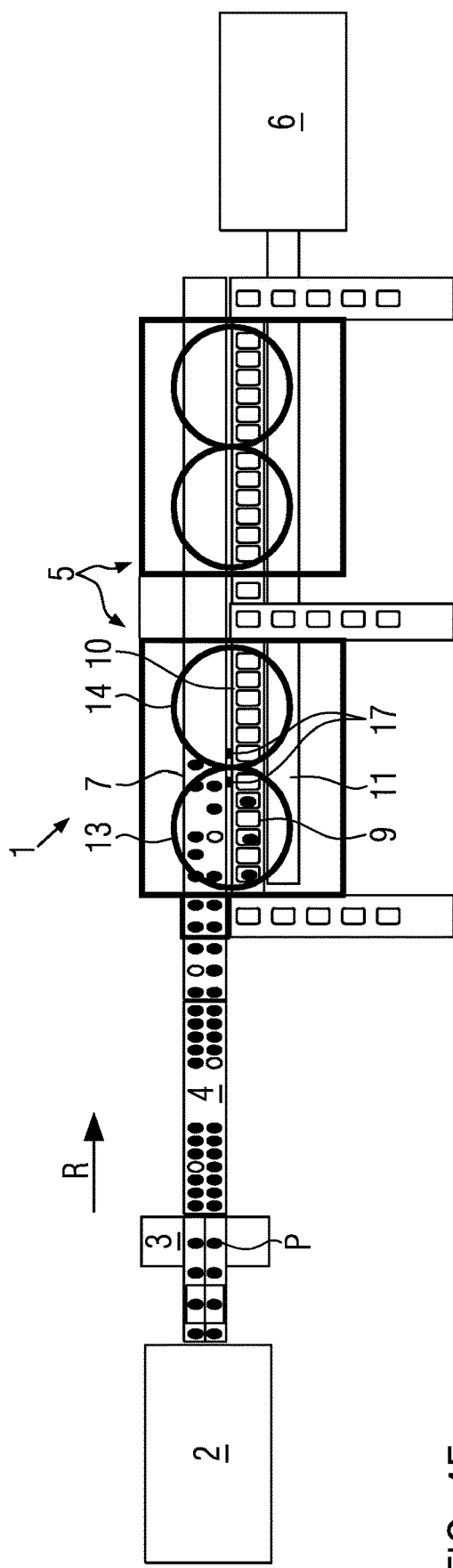

According to FIG. 4E, products P which are not loaded by first picker 13 are transported onward by way of conveyor belt 7 to second picker 14 that is positioned downstream in direction of transport R.

Figure 4F:
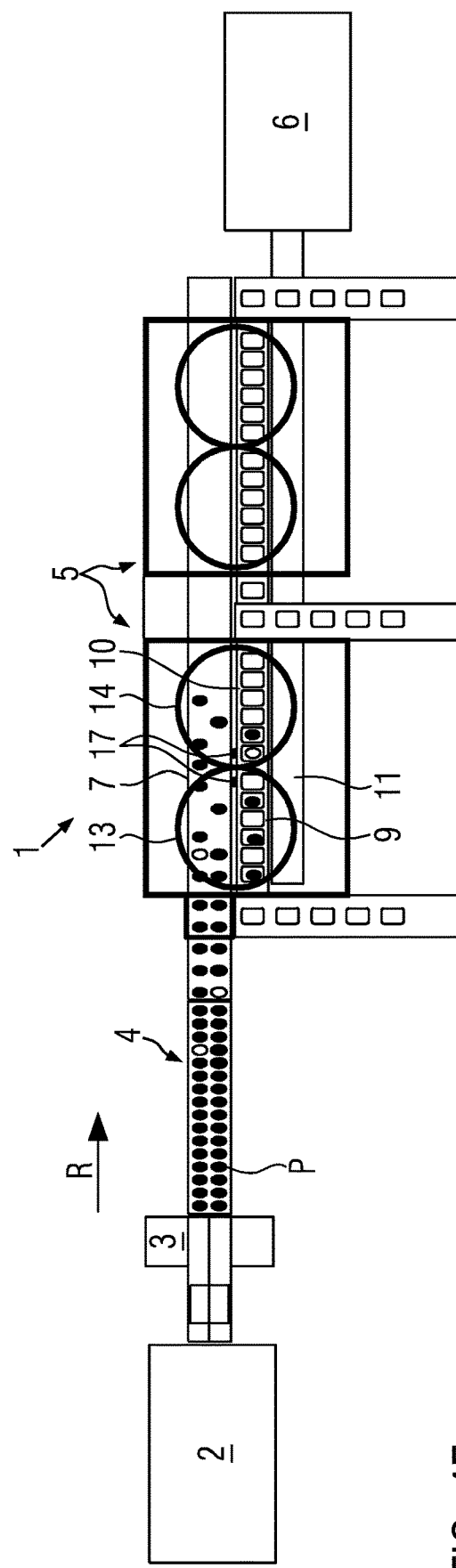

FIG. 4F shows that first picker 13 as well as second picker 14 load products P provided on conveyor belt 7 into trays T which are positioned at first tray conveying section 9 and at second tray conveying section 10. Furthermore, FIG. 4F shows that a further batch of portioned products P has been produced and has caught up with the preceding batch on feed device 4. Feed device 4 shown in FIG. 4F is therefore configured to convey respective batches of products P such that they can be combined in order to continuously deliver products P to the subsequent loading station 5 at predetermined distances.

Figure 4G:
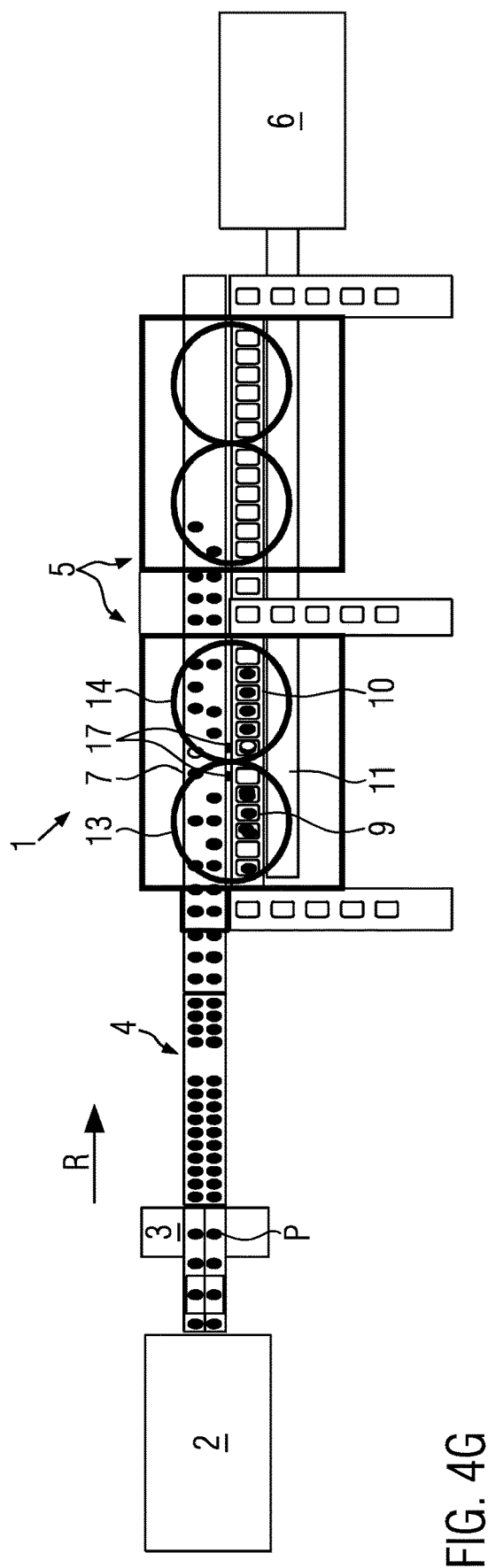

FIG. 4G shows that some products P were not loaded by first loading station 5 shown in direction of production R. These products P are transported to loading station 5 downstream in direction of production R in order to be loaded therein similarly to the preceding loading station.

Figure 4H:
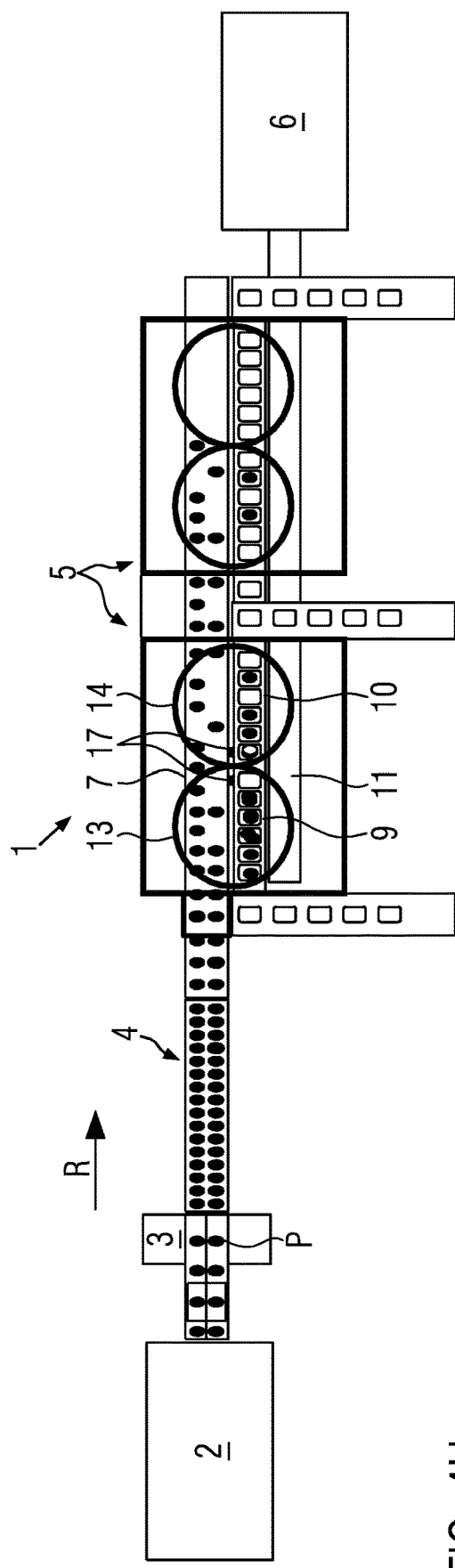

In FIG. 4H, a tray T is now fully loaded with products P in the region of first picker 13, i.e., on first tray conveying section 9, as well as in the region of second picker 14, i.e., on second tray conveying section 10.

Figure 4I:
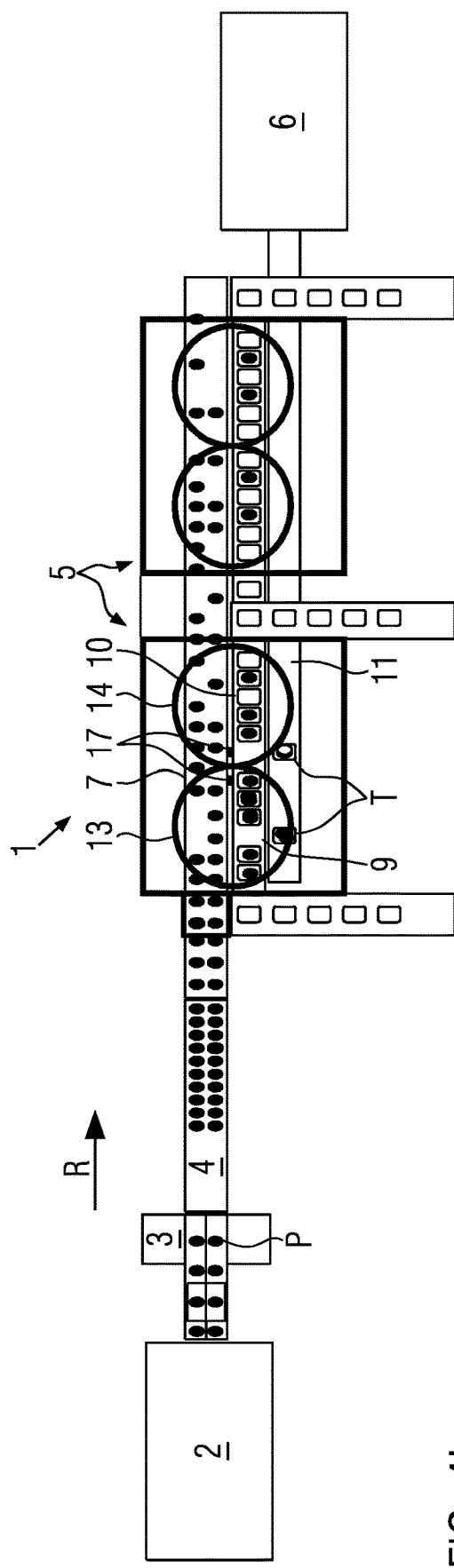

Two trays T completely loaded with product, i.e., to a target value, are transferred to discharge belt 11 according to FIG. 4I. In the region of first picker 13, tray T completely loaded with product is pushed by first picker 13 from first tray conveying section 9 onto discharge belt 11. In the region of second picker 14, tray T completely loaded with product being in the foremost position is pushed by mechanical pusher 17 onto discharge belt 11.

FIG. 4I thereby shows that trays T that have been fully loaded with product at loading station 5 and that are located at the foremost position of first and/or second tray conveying section 9, 10, can be pushed by way of mechanical pusher 17 and trays T positioned therebehind, in the case that they have previously been fully loaded with product P, by way of the first and/or second picker 13, 14, onto discharge belt 11.

Figure 4J:
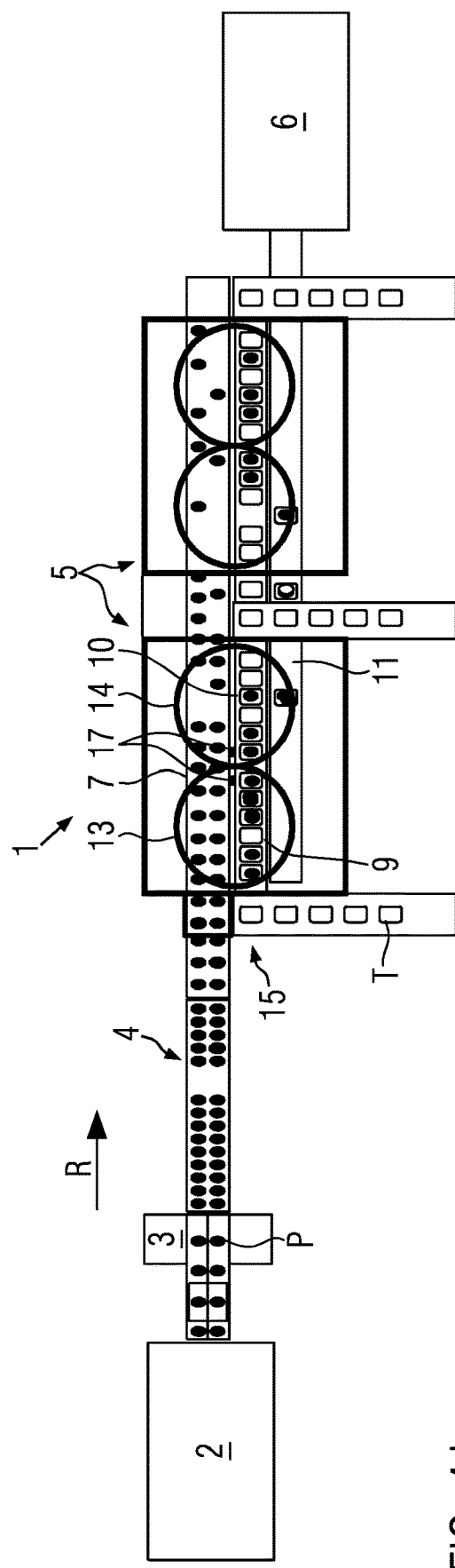

FIG. 4J shows that an empty tray T can move up onto first tray conveying section 9. The same applies for second tray conveying section 10. FIG. 4J further shows that further loading station 5 positioned in direction of production R downstream of loading station 5 begins to push trays T loaded with product onto discharge belt 11. Trays T pushed onto discharge belt 11 are transported onward to tray sealer 6 which is configured to seal trays T, which have been loaded with product to a target value, with a top film.

Figure 5:
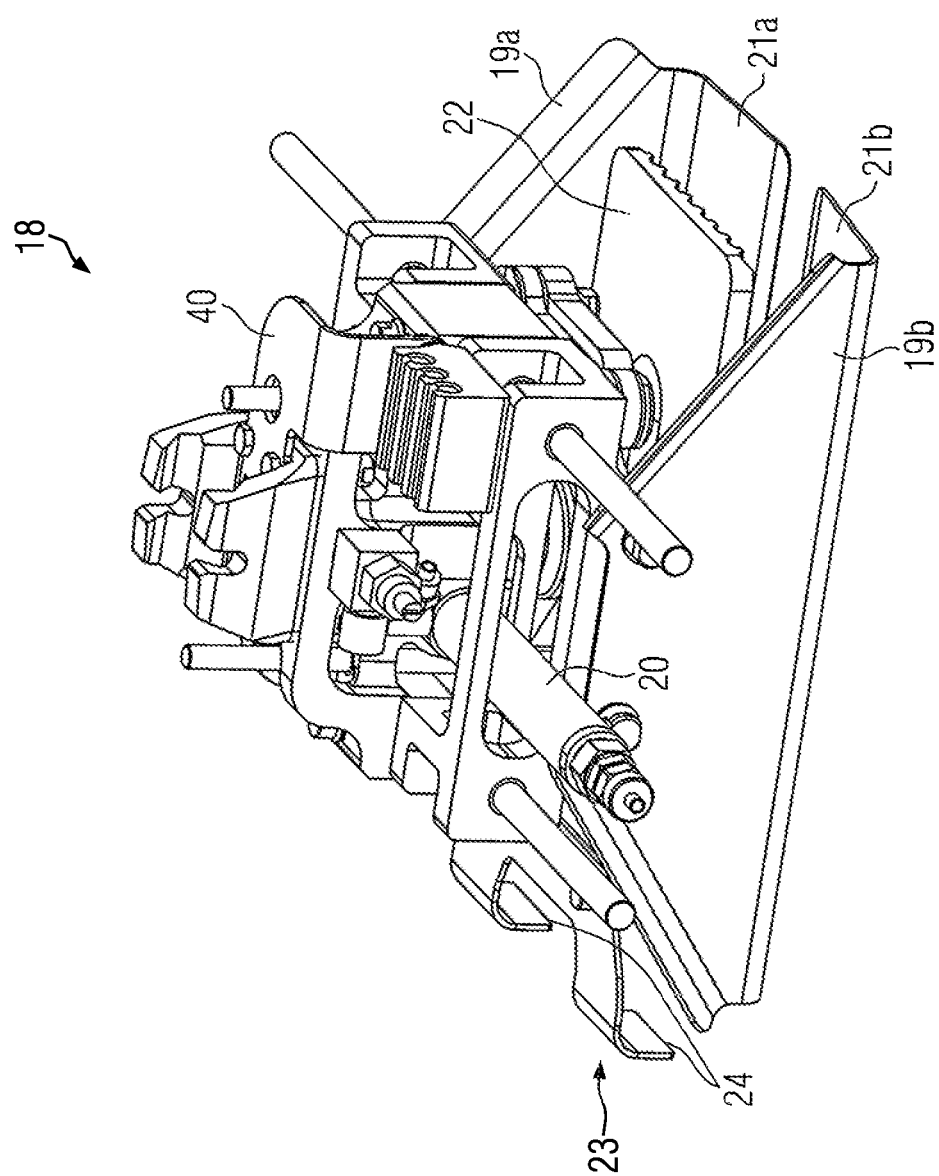
FIG. 5 shows a product gripper as a holding down gripper with a tray pusher.

FIG. 5 shows a gripper unit 18 of picker device 12. Gripper unit 18 is configured to load products P into trays T within loading station 5. Furthermore, gripper unit 18 is configured to push trays T loaded with product to a target value from tray conveyor 8 onto discharge belt 11.

Gripper unit 18 shown in FIG. 5 comprises a product gripper 40 which is present in the form of a holding down gripper. Gripper unit 18 comprises two pick-up scoops 19a, 19b for gripping a product P. Two pick-up blades 19a, 19b can be adjusted by way of a pneumatic cylinder 20. A product P positioned between two pick-up scoops 19a, 19b can be picked up by moving the latter towards each other. Two pick-up scoops 19a, 19b with pushers 21a, 21b formed thereon slide underneath product P to be picked up. Gripper unit 18 according to FIG. 5 comprises a holding down device 22 which presses down from above onto a product P that was picked up by way of two pick-up scoops 19a, 19b in order to fix it in place in gripper unit 18. Holding down device 22 can be adjusted by way of pneumatic cylinder 20 or by way of a separate pneumatic drive unit.

FIG. 5 furthermore shows that gripper unit 18 also comprises a tray pusher 23. Tray pusher 23 can be used to push trays T that have been fully loaded with product from tray conveyor 8 onto discharge belt 11. Tray pusher 23 according to FIG. 5 comprises pusher edge 24 by way of which it can make direct contact with a tray edge of tray T in order to push it from tray conveyor 8 onto discharge belt 11.

Figure 6A:
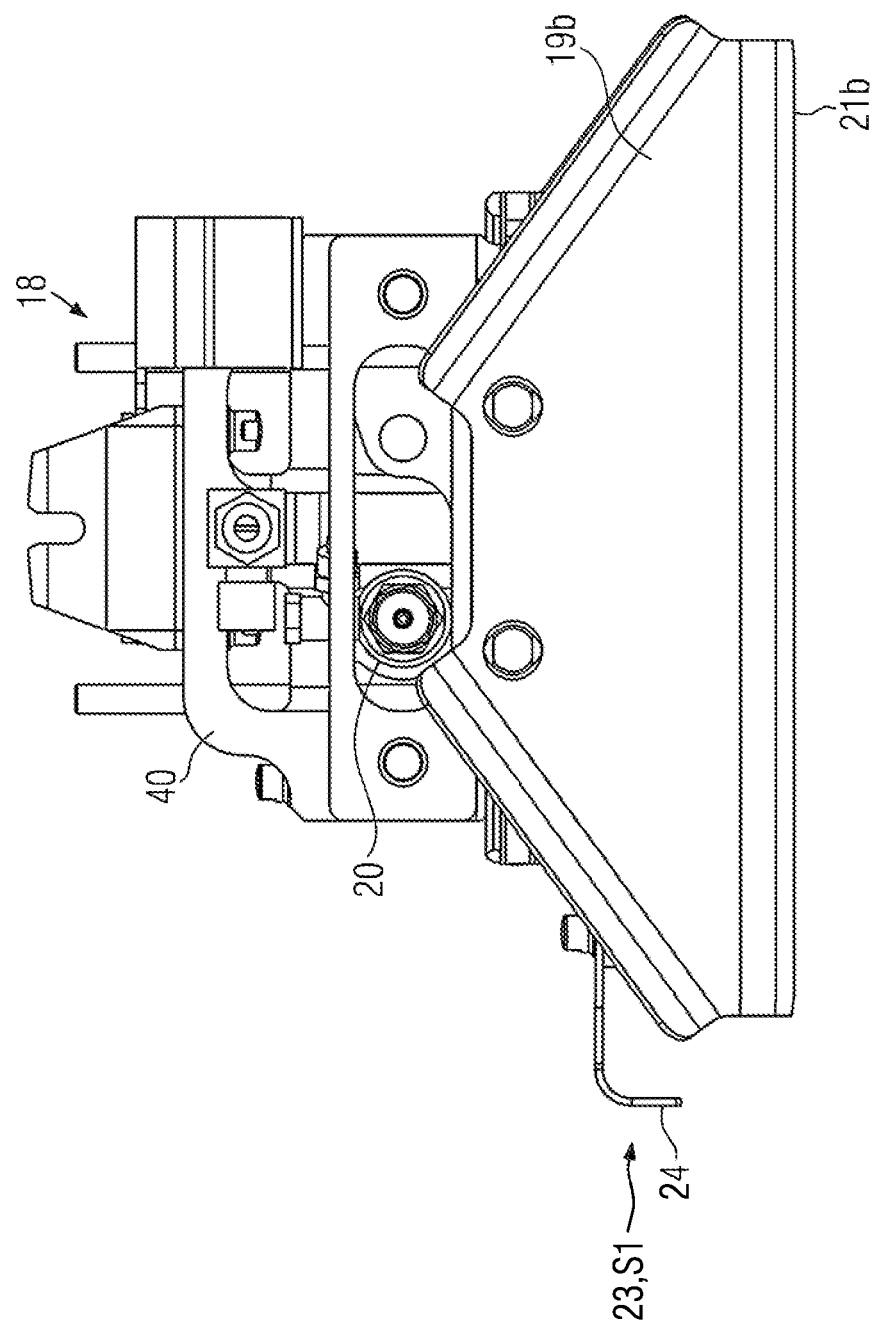
FIG. 6A shows the holding down gripper from FIG. 5 with the tray pusher in a retracted position.

FIG. 6A shows gripper unit 18 from FIG. 5, where tray pusher 23 attached thereto is positioned in a retracted position S1. In retracted position S1, pusher edge 24 of tray pusher 23 is disposed above pusher 21a, 21b of pick-up scoops 19a, 19b. In the setting shown in FIG. 6A, gripper unit 18 is ready to pick up a product P provided on conveyor belt 7 in order to collect it from conveyor belt 7 and insert it into a tray T positioned on tray conveyor 8.

Figure 6B:
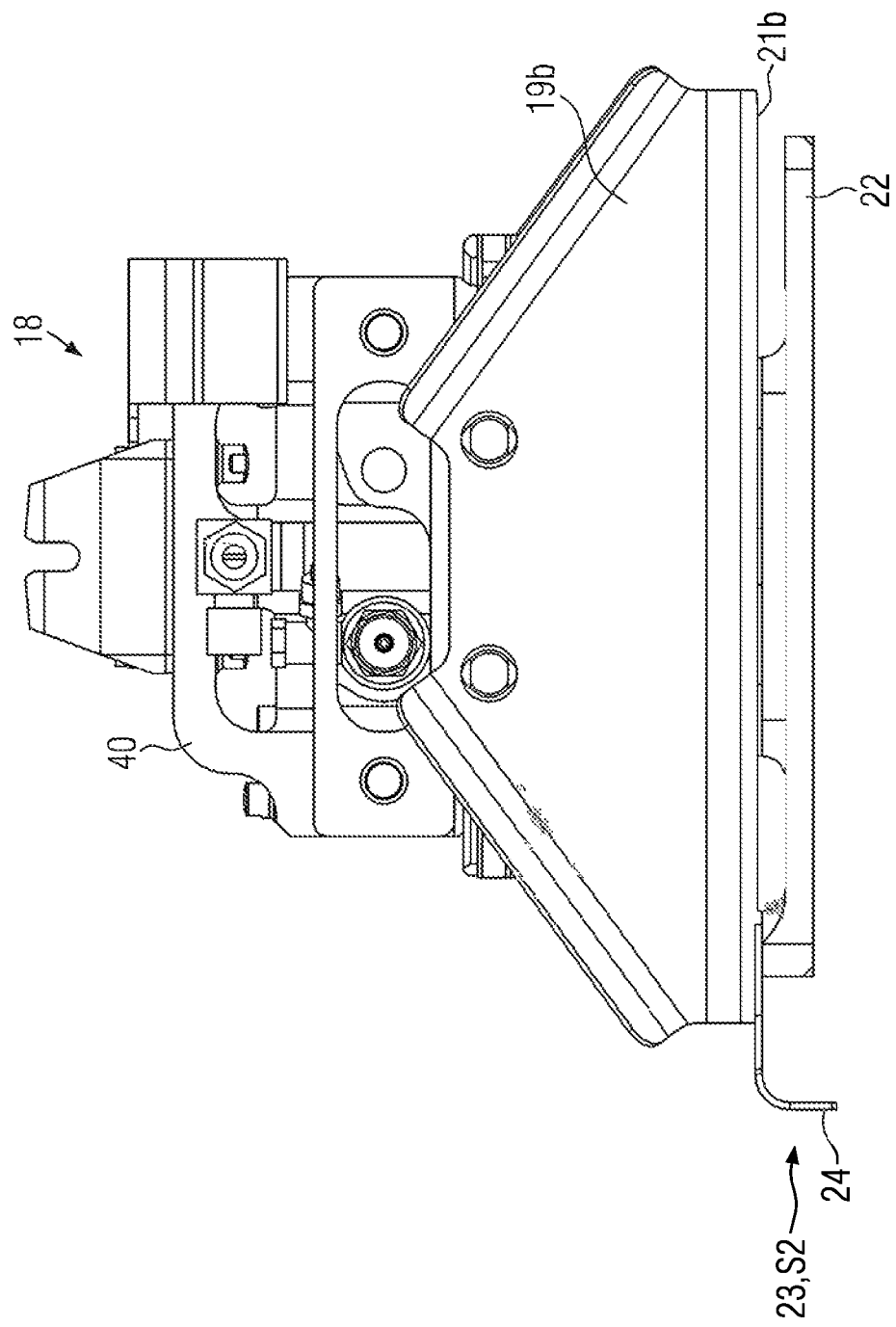
FIG. 6B shows the holding down gripper from FIG. 5 with the tray pusher in an extended position.

FIG. 6B shows tray pusher 23 in an extended position S2. In extended position S2, pusher edge 24 is disposed below pusher 21a, 21b of pick-up scoops 19a, 19b. Furthermore, FIG. 6B shows that holding down device 22 is likewise positioned in a lowered position. According to FIG. 6B, tray pusher 23 is attached to holding down device 22 so that tray pusher 23 is coupled to a motion of holding down device 22.

Figure 7:
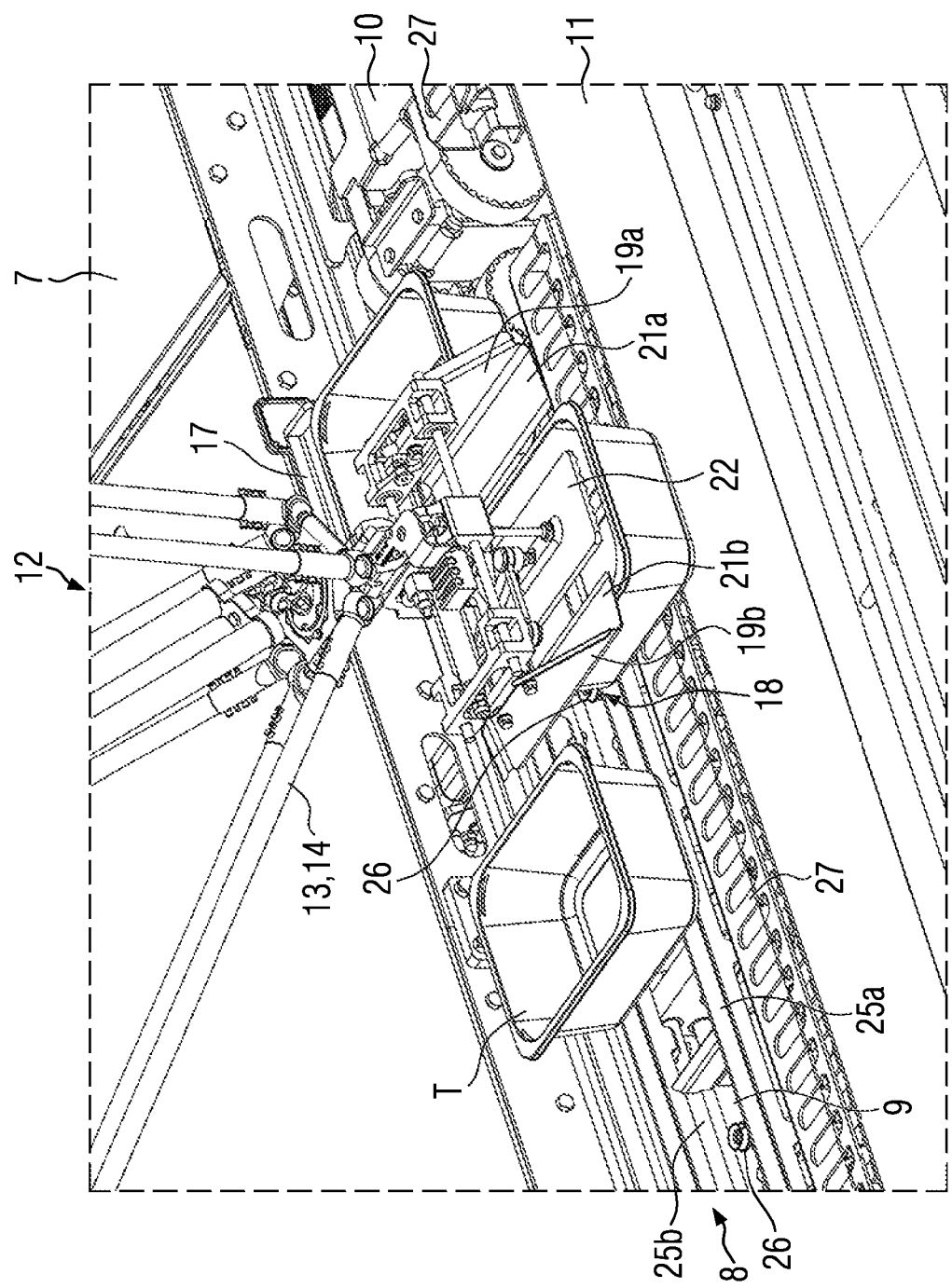
FIG. 7 shows the gripper unit from FIG. 5 when pushing the tray from the tray conveyor onto the discharge belt.

FIG. 7 shows first picker 13 and second picker 14 of picker device 12 with gripper unit 18 from FIG. 5. A tray T is just being pushed in FIG. 7 from tray conveyor 8 onto discharge belt 11 by way of gripper unit 18, in particular by way of tray pusher 23 which has been adjusted thereon to extended position S2. Holding down device 22 is also positioned to be lower according to the explanations for FIG. 6B, whereas two pick-up scoops 19a, 19b are at a maximum distance from one another.

Furthermore, FIG. 7 shows a further tray T which is positioned at the foremost position of first tray conveying section 9. Once it is loaded with products P to a target value, this tray T is pushed by mechanical pusher 17 from first tray conveying section 9 onto discharge belt 11. According to the embodiment shown in FIG. 7, a loading logic according to the "first full-first out" principle can thus be implemented. This means that tray T that is first fully loaded with products on tray conveyor 8, be it with regard to a desired weight or with regard to a desired number of products P, is pushed first by tray conveyor 8 onto discharge belt 11. This can be done by way of pusher 17 or by way of gripper unit 18, depending at which location on tray conveyor 8 tray T is first fully loaded.

According to FIG. 7, tray conveyor 8 comprises two transport belts 25a, 25b running in parallel. Two transport belts 25a, 25b are guided spaced from one another and provide lateral support surfaces for trays T conveyed thereon. In addition, FIG. 7 shows that several suction units 26 are arranged between two transport belts 25a, 25b. Respective trays T can be suctioned at their tray bases by way of suction units 26. Trays T then remain positioned in a desired orientation during transport by way of the two transport belts 25a, 25b for being loaded with products P. When moving fully loaded trays T from tray conveyor 8 to discharge belt 11 positioned adjacent thereto, suction unit 26 positioned below tray T to be pushed can be deactivated so that tray T can be pushed more easily onto discharge belt 11.

FIG. 7 furthermore shows that a guide system 27 is arranged between tray conveyor 8 and discharge belt 11. Guide system 27 in FIG. 7 fills a gap formed between first tray conveying section 9 and discharge belt 11 and serves as a bridge across which tray T is pushed by way of gripper unit 18. According to FIG. 7, guide system 27 together with first tray conveying section 9 and discharge belt 11 is disposed in a common transport plane for tray T which is pushed by way of gripper unit 18. Guide system 27 is mounted to be adjustable in height. During the feed process and/or load process of trays T, guide system 27 can be raised in order to function as a tray guide for trays T positioned on tray conveyor 8. Guide system 27 is then positioned laterally at the height of the tray side walls and ensures that trays T conveyed on tray conveyor 8 can maintain a desired orientation. To move fully loaded trays T, guide system 27 is lowered to the position shown in FIG. 7 to enable fully loaded trays T to be pushed from tray carrier 8 onto discharge belt 11.

Figure 8:
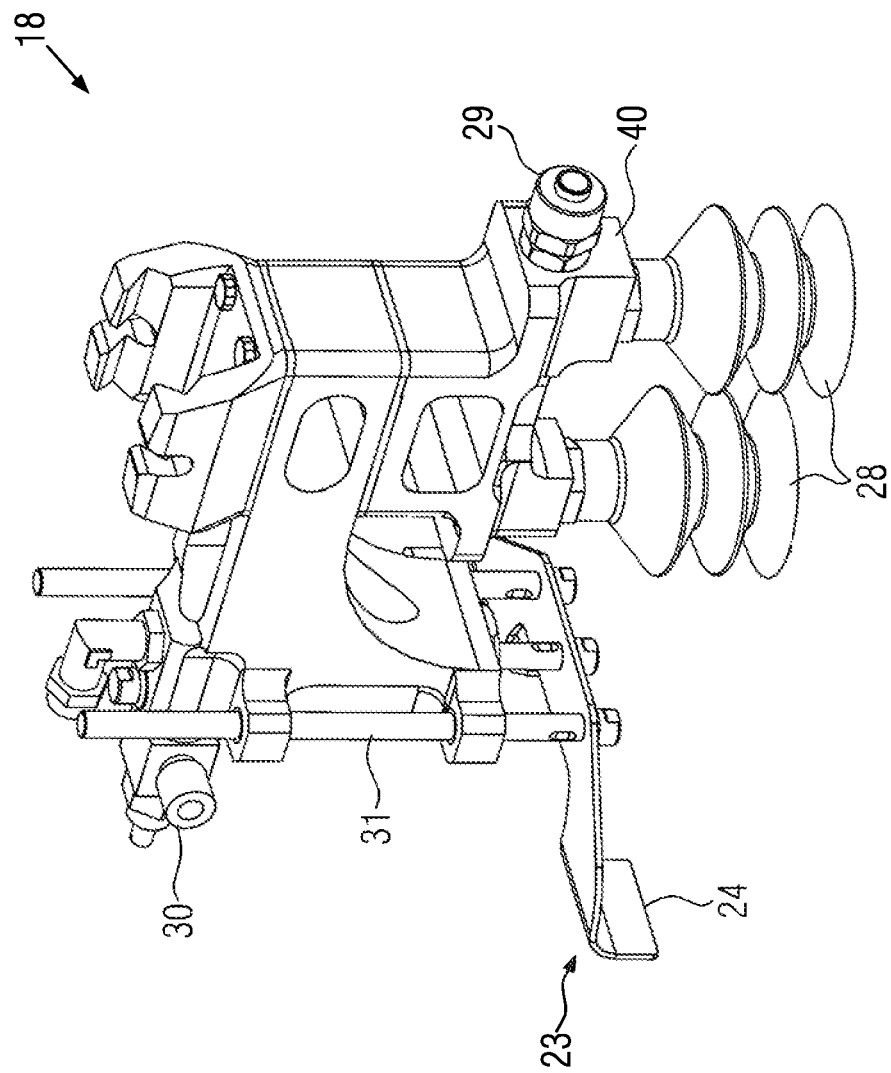
FIG. 8 shows a gripper unit configured as a suction gripper with a tray pusher.

Product gripper 40 of gripper unit 18 shown in FIG. 8 is configured as a suction gripper. The suction gripper from FIG. 8 comprises two suction cups 28 which can be supplied with a vacuum via a connection 29. Two suction cups 28 can attach to an upper side of respective products P and lift them from conveyor belt 7 into trays T provided on tray conveyor 8.

FIG. 8 also shows that tray pusher 23 on gripper unit 18 shown therein is configured as a separately controllable unit. For this purpose, a pneumatic drive 30 is provided on gripper unit 18 from FIG. 8, by way of which tray pusher 23 can be moved between retracted position S1 and extended position S2. According to FIG. 8, tray pusher 23 comprises a linear guide 31 which ensures that tray pusher 23 is configured to be stable, in particular in extended position S2, for moving fully loaded trays T.

Gripper units 18 shown in FIGS. 5 and 8 are present as a modular exchangeable kit for respective pickers 13, 14 and can be employed depending on the nature of products P to be loaded.

Figure 9A:
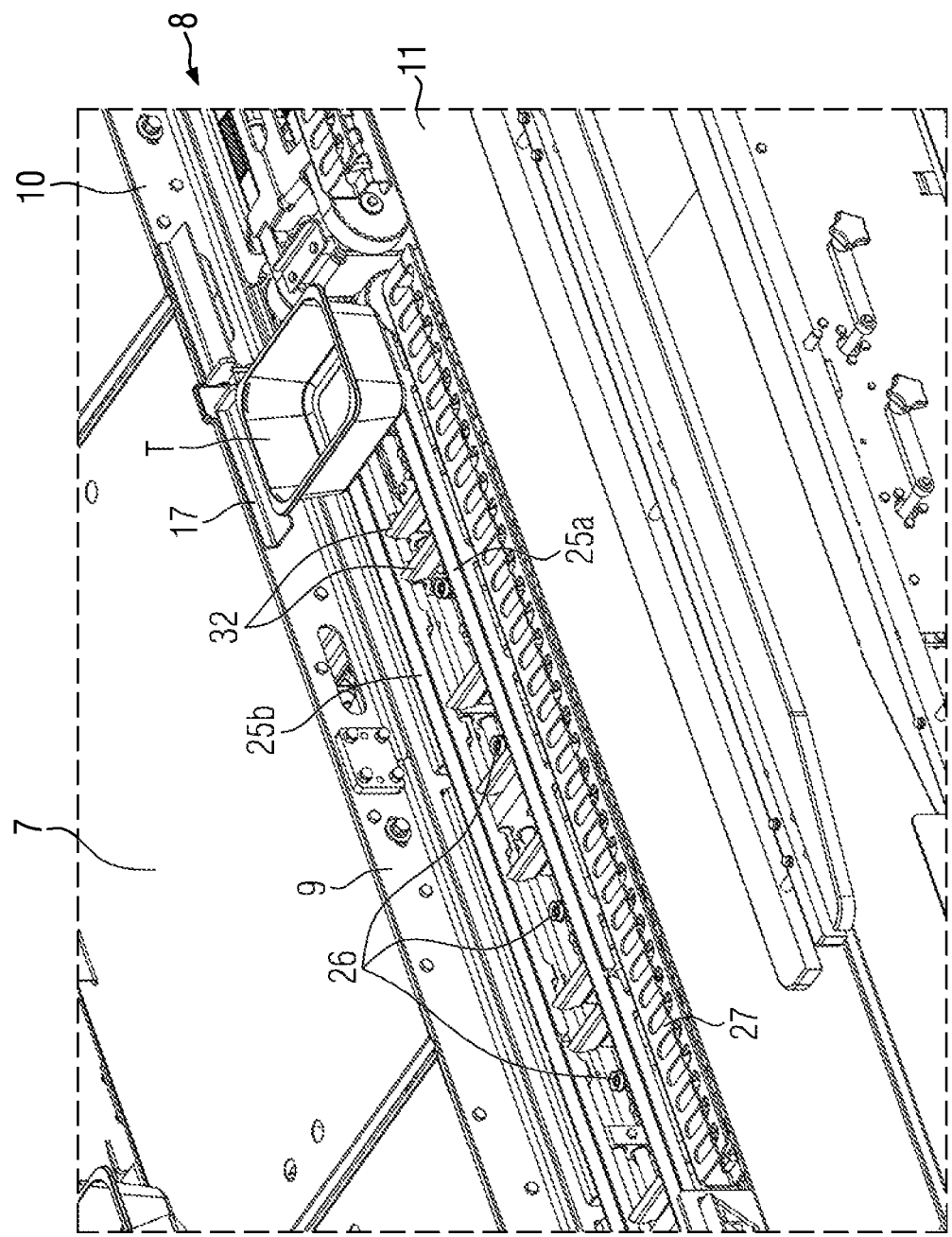
FIG. 9A shows a tray conveyor in an isolated illustration with a mechanical pusher in a retracted position.

FIG. 9A shows first tray conveying section 9 of tray conveyor 8 with a tray T positioned at the foremost position of first tray conveying section 9. Mechanical pusher 17 provided for first tray conveying section 9 can be employed to move tray T. Pushing tray T by way of mechanical pusher 17 from the foremost position of first tray conveying section 9 via lowered guide system 27 onto discharge belt 11 is shown in FIG. 9B.

Figure 9B:
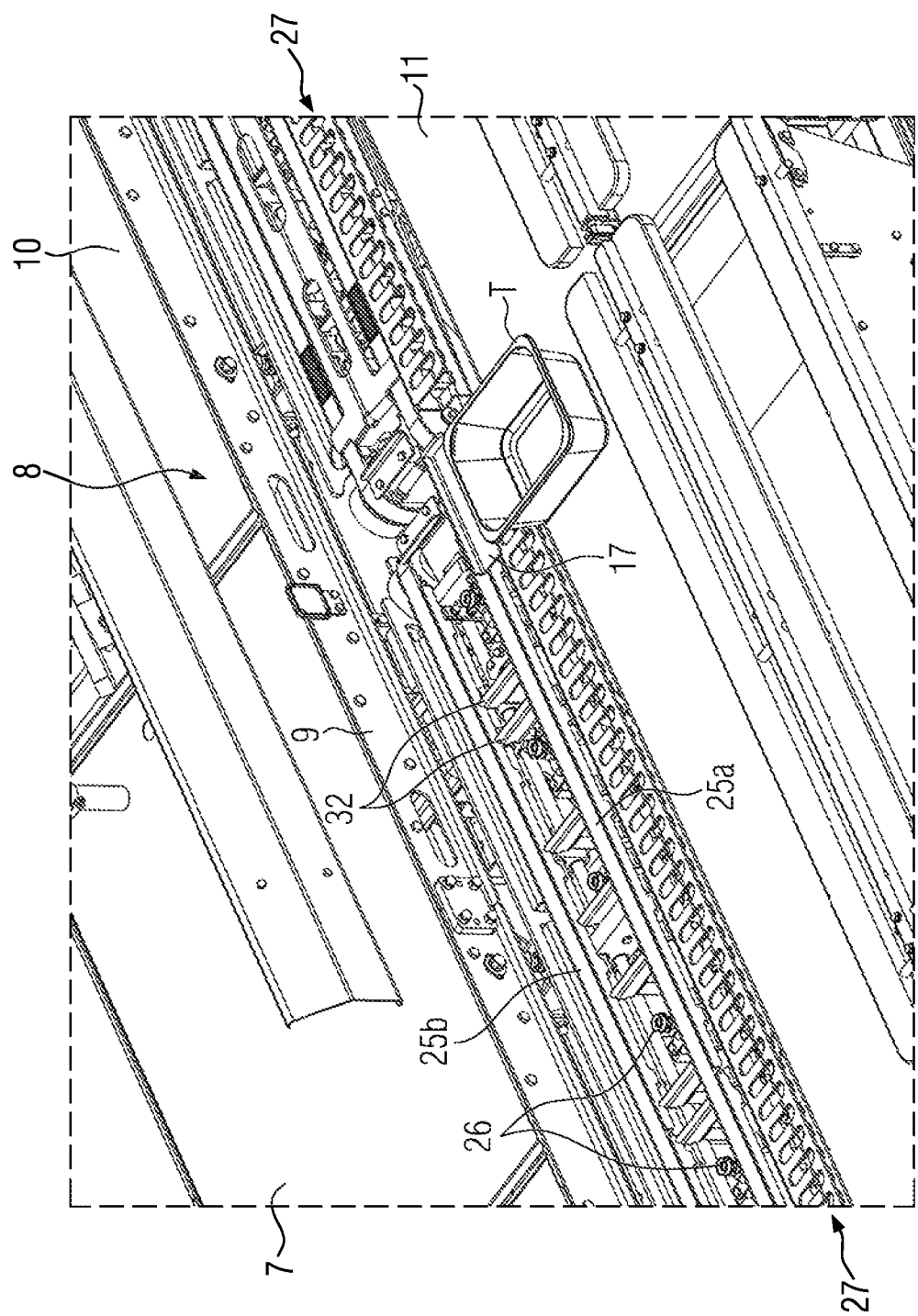
FIG. 9B shows the tray conveyor from FIG. 9A with the mechanical pusher in an extended position.

Furthermore, FIGS. 9A and 9B show that tray conveyor 8 provides several adjustable stopper elements 32 along first tray conveying section 9 which are adjustable in terms of the size of trays T to be loaded in the direction of transport of tray conveyor 8. Stopper elements 32 can also be used to keep trays T positioned on tray conveyor 8 at the desired distances from one another. Furthermore, the respective suction effects of suction units 26 can be influenced by way of stopper elements 32.

FIG. 9B shows that guide system 27, which is formed along second tray conveying section 10, is positioned in a raised position for being employed as a tray guide along second tray conveying section 10. Guide system 27 along first tray conveying section 9 is positioned in a lowered position for pushing tray T.

What is claimed is:

1. A method for inserting products into trays at a loading station for a tray sealer, the method comprising:
    loading a tray of several trays, provided on a tray conveyor, with product by way of a gripper unit to a target value at the loading station; and
    pushing the tray from the tray conveyor onto a discharge belt of the loading station by way of a tray pusher formed on the gripper unit;
    wherein the tray pusher directly contacts the tray while pushing the tray onto the discharge belt, and wherein the loading station comprises between the tray conveyor and the discharge belt a guide system that is adjustable between a first position, in which the guide system forms a tray guide for guiding trays as the trays move with the tray conveyor, and a second position, in which the guide system forms a bridge between the tray conveyor and the discharge belt.

2. The method according to claim 1, wherein the gripper unit pushes the tray loaded with product to the target value onto the discharge belt already when another tray conveyed ahead on the tray conveyor has not yet been loaded with product to a target value.

3. The method according to claim 1, wherein the tray pusher on the gripper unit is adjusted from a retracted position to an extended position for pushing the tray loaded with product to the target value onto the discharge belt.

4. The method according to claim 1, wherein the tray positioned on the tray conveyor is suctioned at a tray base of the tray at least temporarily during the loading.

5. The method according to claim 1, wherein pushing the tray onto the discharge belt comprises moving the tray pusher from a raised, retracted position to a lowered, extended position in order for the tray pusher to directly contact the tray.

6. The method according to claim 1, wherein pushing the tray from the tray conveyor onto the discharge belt comprises pushing the tray, by the tray pusher, across the bridge.

7. A loading station for a tray sealer, comprising:
    a conveyor belt for feeding individual products;
    a tray conveyor for feeding empty trays;
    a discharge belt for removing trays loaded with product;
    a guide system between the tray conveyor and the discharge belt; and
    at least one picker device with a gripper unit comprising a product gripper that is configured to pick up a product made available to the loading station and insert the product into a tray fed to the loading station on the tray conveyor, wherein the gripper unit further comprises a tray pusher for pushing a tray loaded by way of the product gripper;
    wherein the tray pusher is configured to directly contact the tray loaded by way of the product gripper in order to push the tray from the tray conveyor to the discharge belt, and wherein the guide system is adjustable between a first position, in which the guide system is employable for the tray conveyor as a tray guide configured to guide trays as the trays move with the tray conveyor, and a second position, in which the guide system forms a bridge between the tray conveyor and the discharge belt across which trays loaded with product are pushable.

8. The loading station according to claim 7, wherein the tray pusher comprises at least one pusher edge for pushing trays loaded with product.

9. The loading station according to claim 7, wherein the gripper unit comprises at least one pneumatic drive for adjusting the tray pusher.

10. The loading station according to claim 7, wherein the gripper unit comprises at least one linear guide for the tray pusher.

11. The loading station according to claim 7, wherein the product gripper is configured as a suction gripper or as a holding down gripper.

12. The loading station according to claim 7, wherein the tray conveyor comprises two transport belts running in parallel as well as at least one suction unit arranged between the transport belts which is configured to suction trays transported by way of the tray conveyor at their tray bases.

13. The loading station according to claim 7, wherein the tray conveyor comprises several stopper elements that can be adjusted in a direction of transport of the tray conveyor in terms of size of the trays to be loaded.

14. The loading station according to claim 7, wherein the tray pusher is configured to directly contact the tray loaded by way of the product gripper in order to push the tray from the tray conveyor onto the discharge belt.

15. The loading station according to claim 7, wherein the gripper unit comprises a holding down device configured to hold down the product picked up by the product gripper, and wherein the tray pusher is attached to the holding down device so that the tray pusher is movable with the holding down device.

16. A packaging system, comprising:
a slicing machine for producing individual products;
a weighing system for weighing the individual products;
at least one loading station according to claim 7; and
a tray sealer for sealing trays loaded with product.

* * * * *